(12) United States Patent
Kwatra et al.

(10) Patent No.: US 11,657,227 B2
(45) Date of Patent: May 23, 2023

(54) CORPUS DATA AUGMENTATION AND DEBIASING

(71) Applicant: INTERNATIONAL BUSINESS MACHINES CORPORATION, Armonk, NY (US)

(72) Inventors: Shikhar Kwatra, San Jose, CA (US); Nishtha Madaan, Gurgaon (IN); Sushain Pandit, Austin, TX (US); Kuntal Dey, Rampurhat (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 17/148,020

(22) Filed: Jan. 13, 2021

(65) Prior Publication Data
US 2022/0222438 A1    Jul. 14, 2022

(51) Int. Cl.
*G06F 40/289* (2020.01)
*G06F 16/28* (2019.01)
*G06N 20/00* (2019.01)
*G06F 40/58* (2020.01)

(52) U.S. Cl.
CPC .......... *G06F 40/289* (2020.01); *G06F 16/285* (2019.01); *G06F 40/58* (2020.01); *G06N 20/00* (2019.01)

(58) Field of Classification Search
None
See application file for complete search history.

(56) References Cited

U.S. PATENT DOCUMENTS

| 10,796,104 | B1* | 10/2020 | Lee ................... G06F 40/284 |
| 2014/0214401 | A1 | 7/2014 | Li et al. |
| 2018/0246873 | A1* | 8/2018 | Latapie .............. G06N 3/088 |
| 2020/0143794 | A1* | 5/2020 | Beaver ................ G06F 17/16 |
| 2020/0151555 | A1 | 5/2020 | Kozhaya et al. |

(Continued)

FOREIGN PATENT DOCUMENTS

| CN | 106202177 B | 6/2016 |
| CN | 107169001 A | 3/2017 |

(Continued)

OTHER PUBLICATIONS

Wu, Xing, et al. "Conditional bert contextual augmentation." International conference on computational science. Springer, Cham, 2019. (Year: 2019).*

(Continued)

*Primary Examiner* — Douglas Godbold
(74) *Attorney, Agent, or Firm* — Rakesh Roy; Matthew M. Hulihan; Heslin Rothenberg Farley & Mesiti PC

(57) ABSTRACT

Machine learning model training corpus debiasing includes identifying an attribute of input text selected from the training corpus, the attribute including word(s) of the input text, and the attribute corresponding to an attribute class encompassing different possible class values, recognizing bias in the input text with respect to the attribute class, and generating output text corresponding to the attribute and imparting diversity with respect to the attribute class and relative to the input text, where generating the output text uses an optimization function based on loss objectives to minimize loss in the generated output text as compared to the input text.

20 Claims, 5 Drawing Sheets

(56) References Cited

U.S. PATENT DOCUMENTS

| | | | | |
|---|---|---|---|---|
| 2020/0311486 A1* | 10/2020 | Dey | ......................... | G06F 9/542 |
| 2021/0390951 A1* | 12/2021 | Gadde | ..................... | G06F 40/30 |
| 2022/0004820 A1* | 1/2022 | Meron | ................... | G06N 3/006 |
| 2022/0147713 A1* | 5/2022 | Garimella | ............ | G06K 9/6218 |

FOREIGN PATENT DOCUMENTS

| | | |
|---|---|---|
| CN | 107844417 A | 10/2017 |
| CN | 110175236 A | 4/2019 |
| CN | 111753044 A | 6/2020 |

OTHER PUBLICATIONS

Radford, A., et al., Better Language Models and Their Implications, OpenAI, Feb. 14, 2019, 13 pgs. Retrieved on Dec. 16, 2020 from the Internet URL: <https://openai.com/blog/better-language-models/>.

Mell, Peter, et al., "The NIST Definition of Cloud Computing", NIST Special Publication 800-145, Sep. 2011, Gaithersburg, MD, 7 pgs.

* cited by examiner

CORPUS DATA AUGMENTATION AND DEBIASING

BACKGROUND

Machine learning models are trained using a training corpus of data 'samples'. In the case of a language learning model, the training corpus might encompass text segments (paragraphs, sentences, phrases, words, etc.). A significant factor influencing the accuracy of such a model is the completeness of the training corpus. Consequently, bias exhibited in the text of the training samples in the corpus will undesirably impart a bias in the model's classification of other inputs.

SUMMARY

Shortcomings of the prior art are overcome and additional advantages are provided through the provision of a computer-implemented method. The method includes identifying an attribute of input text, the input text selected from a machine learning model training corpus, the attribute including one or more words of the input text, and the attribute corresponding to an attribute class encompassing a plurality of different possible class values; recognizing bias in the input text with respect to the attribute class; and generating output text corresponding to the attribute and imparting diversity with respect to the attribute class and relative to the input text, where generating the output text uses an optimization function based on a plurality of loss objectives to minimize loss in the generated output text as compared to the input text.

Further, a computer system is provided that includes a memory and a processor in communication with the memory, wherein the computer system is configured to perform a method. The method includes identifying an attribute of input text, the input text selected from a machine learning model training corpus, the attribute including one or more words of the input text, and the attribute corresponding to an attribute class encompassing a plurality of different possible class values; recognizing bias in the input text with respect to the attribute class; and generating output text corresponding to the attribute and imparting diversity with respect to the attribute class and relative to the input text, where generating the output text uses an optimization function based on a plurality of loss objectives to minimize loss in the generated output text as compared to the input text.

Yet further, a computer program product including a computer readable storage medium readable by a processing circuit and storing instructions for execution by the processing circuit is provided for performing a method. The method includes identifying an attribute of input text, the input text selected from a machine learning model training corpus, the attribute including one or more words of the input text, and the attribute corresponding to an attribute class encompassing a plurality of different possible class values; recognizing bias in the input text with respect to the attribute class; and generating output text corresponding to the attribute and imparting diversity with respect to the attribute class and relative to the input text, where generating the output text uses an optimization function based on a plurality of loss objectives to minimize loss in the generated output text as compared to the input text.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
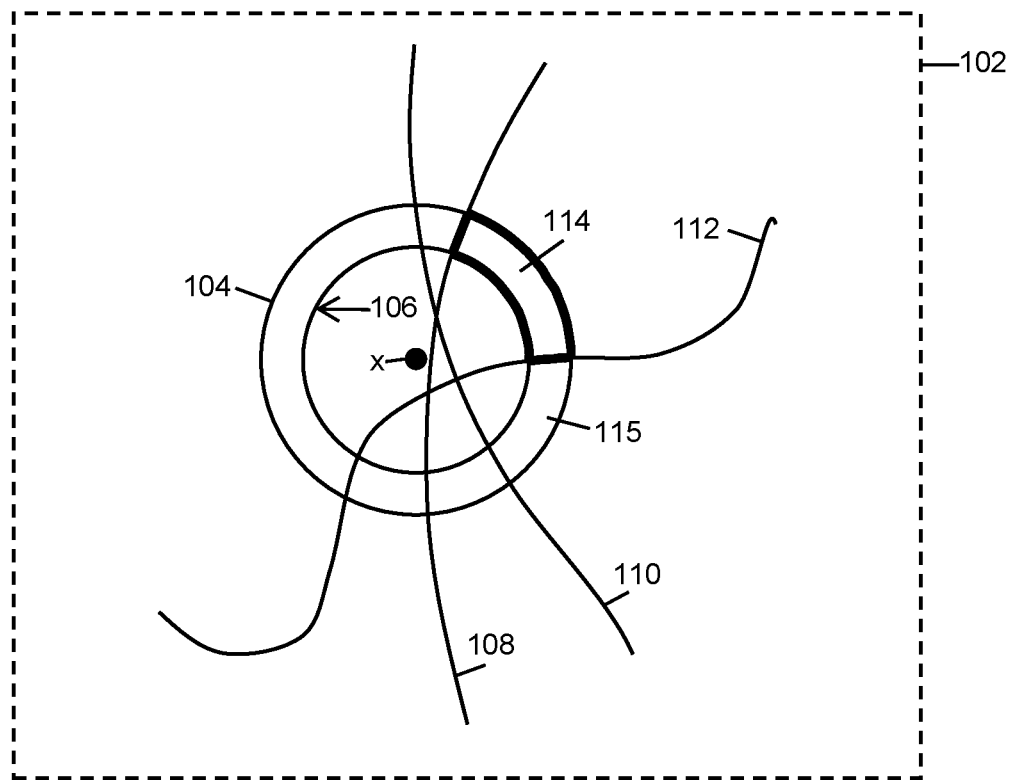
FIG. 1 presents a conceptual diagram for minimizing loss in generated output text as compared to input text, in accordance with aspects described herein.

One focus in the production of an effective machine learning model is eliminating bias in the training data so that the model is fair in its classification of inputs. In text-based and other forms of training data, bias can be exhibited on various dimensions. Example such biases relative to individuals may be age-based, occupation-based, class-based (socio-economic), geopolitical-based, and so on. One approach to debiasing training data along a dimension is to ensure that sufficient samples along that dimension exist so that the samples as a whole represent an adequate cross-section of that dimension, even if samples taken individually exhibit some level of bias. For instance, if one input training sample is biased in favor of one demographic but there are other input training samples biased in favor of the other possible demographics, then the training data overall may not exhibit any bias in favor of any one particular demographic.

Text includes vectors of sentences, and each sentence includes a vector of words. Each text can be modeled to include an attribute reflected by word(s) of the text, the attribute corresponding to some attribute class that encompasses different possible class values. As an example, a sentence of words may have as its subject and focus a student (the attribute). The student (attribute) can have a particular hair color, for example brown. A student (the attribute) corresponds to an attribute class, i.e. 'hair color'; each student may be assumed to have a hair color. That attribute class (hair color) encompasses different possible class values (hair color values, for instance black, brown, red, gray, etc.). Using this example, an input text sentence about a student that has brown hair may reflect a bias with respect to hair color. For instance, the bias may be that students are assumed to have (i.e. classified by the model as having) brown hair based on this input text sentence, even though in actuality students have varying hair colors. Additional training examples, for instance conveying that other students have other colored hair, can help eliminate the bias that might otherwise be presented in a model.

Aspects described herein relate to a linear transformation of text attributes, where constituent attribute vectors of the words that occur within a text segment (such as sentence) can be combined into a single attribute vector by considering the corresponding dimension of the word vector. These attributes can be used for text transformations. For instance, the input text "My boss is left-handed" selected as a sample from a training corpus may be transformed to "My boss is right-handed" to reflect a handedness-based transformation. The transformed sentence "My boss is right-handed" may be added as another example to the training corpus to debias the training corpus. In this case, the debiasing effort proper represents both class values 'right-handed' and 'left-handed'. In other examples, ambidexterity may also be represented by another added sample. It is noted that such a debiasing effort may focus on adding additional training samples that themselves are biased if considered in insolation. However, the additional samples are useful on the basis that adding them to the training corpus renders the training corpus, as a whole, to be inclusive of samples that collectively represent varying class values such that, overall, no bias is exhibited in favor of any particular class value.

As described more fully herein, an input text can contain an attribute (word or words) of focus, which attribute can be used for data transformation/corpus augmentation in a debiasing effort. In general, training fairness debiasers requires substantial data for corpus augmentation. In practical applications, such attributes in a dataset generally tend to be sparse. Aspects described herein provide approaches for text augmentation based on attributes such that generated data is not sparse and is attribute-wise. By 'not sparse' is meant that 'loss' in transforming an input text to a generated output text is minimized, that is, meaning and scope of the input text is preserved in the output text. By 'attribute-wise' is meant that output text generation is attentive to the attribute intended for debiasing, rather than focusing on arbitrarily changing attributes in an effort to diversify the training corpus.

One current approach for debiasing is use of crowdsourced data, but crowdsourced data generally does not consist of sufficient numbers of attribute and class values, and directly applying debiasing algorithms does not help. Crowdsourced data might be specific to a given geography, for instance, and therefore represent bias toward class values common to that geography. Other approaches rely on manual effort. There are other techniques like attribute masking or variable augmentation but these techniques do not work well without sufficient data upon which to operate. Conventional practices do not do a good job maintaining the scope and semantics of the original input text (e.g. existing sample in the training corpus). Simply changing one word of the input text can often result in uncontrolled 'loss' when going from input text to output text, changing the intent and meaning of the original sentence. With complex sentences, a challenge exists in how to ensure that meaning, intent, and scope is maintained when building additional training samples to debias the training corpus.

Aspects therefore provide for generating training corpus augmentations corresponding to a certain attribute of input text to provide more data specific to a class to which the attribute corresponds. This enables debiasing an initial training corpus around an attribute by generating additional training text that neutralizes the bias of the initial training corpus. An example data augmentation framework specific to a given attribute includes attribute extraction and text generation from a given dataset (training corpus) in order to ensure that output text (additional training samples) is generated corresponding to the attribute and a corresponding attribute class within the context of the input text and with minimal loss. These generated text samples can augment the training corpus to provide a debiased training corpus. Additionally or alternatively, they can act as test cases/baselines to evaluate other text debiasing algorithms/models. An augmentation report can also be provided in text. In this manner, generated output can be used as a benchmark for testing how well other debiasing approaches work.

In some aspects, a process identifies an attribute of input text, the input text being, for instance, a sentence or a phrase as a training sample in a machine learning model training corpus. The attribute can include one or more words of the input text, and corresponds to an attribute class that encompasses different possible class values. An example training sentence might focus on a male individual of a given occupation (economist). The attribute (economist) corresponds potentially to many different attribute classes, but by way of one example it corresponds to a 'gender' attribute class gender, and that class has different possible values. The process can recognize bias in the input text with respect to the attribute class (gender), for instance by recognizing that 'economist' has representation from only the class value 'male'. In this regard, it can identify that one possible class value of the different possible class values of the attribute class is represented by the input text and one (or more) other possible class values of the different possible class values of the attribute class is not represented by the input text. It may additionally check whether the other class values are represented by other training samples of the training corpus in determining whether bias exists in the corpus as a whole. The process can also generate output text, for instance sentence(s), that correspond to the attribute (economist) and impart diversity with respect to the attribute class and relative to the input text. As part of this generating, an optimization function is used that is based on various loss objectives in order to minimize loss in the generated output text as compared to the input text. In some examples, each output text can represent a respective different possible class value of the different possible class values of the attribute class.

A transformer-based language model, such as GPT-2 offered by OpenAI, predicts a next word given a set of prior words within a sentence and can be leveraged in building an architecture for generating text output (such as sentences). Additional hyperparameters can be introduced with the optimization function focusing on a specific set of loss objectives as described herein. The loss objectives can focus the architecture to generate text while being attentive to a specific attribute class. This 'attention' is illustrated in FIG. 1 as described below with reference thereto.

The optimization function can encapsulate multiple different types of losses. A goal may be to minimize these losses—that is minimize the loss across the initial input and the projected outputs—in selecting generated candidate output text.

The loss objectives include:
(i) Label Loss: Cross entropy loss (in the generated output text as compared to the input text) is used as the Label Loss;
(ii) Proximity Loss: The loss of proximity of the generated output text as compared to the input text. Proximity loss is used to keep perturbations close to the input text. A hyperparameter $\lambda$ can be used to control strength of the proximity loss in the optimization function.

(iii) Attribute Loss: The loss of attentiveness to the identified attribute (from the input text) in the generated output text as compared to the input text. Attribute Loss is used to allow perturbations generated from a defined attribute space. It is generally desired to minimize the loss (keep it within a defined attribute space), and allow for perturbations within that space. A basic scenario involves one attribute, but in others the approach considers synonyms or semantically equivalent attributes, allowing for perturbations.

(iv) Diversity Loss: Overlap in diversity with respect to the attribute class of the generated output text as compared to the input text. Debiasing here encourages diversity in terms of the class values represented in the training corpus; overlap in this regard may be disadvantageous (else it exacerbates the bias). Thus, Diversity Loss is used to encourage a diverse set of counterfactuals to be generated.

The optimization function can be configured to minimize loss in the generated output text as compared to the input text by minimizing a composite of at least the loss objectives identified above, i.e. label loss, proximity loss, attribute loss, and diversity loss, in selecting candidate output text to output as the generated output text. The optimization function encourages diversity in the representation of different possible class values of the attribute class by minimizing the diversity loss (minimize overlap in diversity with respect to the attribute class) of the generated output text as compared to the input text, thereby maximizing diversity in representation of the different possible class values of the attribute class across the aggregated input text and generated output text.

It may not be the case that every, or even any, of the four loss objectives is necessarily minimized when selecting any given candidate output text to output into the training corpus. The objective function may be to minimize these losses on the whole, i.e. a function of those four losses (for instance a sum of them). This composite loss for each of potentially several candidate output texts can be compared and the one (or more) with the lowest/lower composite loss(es) can be output as the generated output text for inclusion in the training corpus.

FIG. 1 presents a conceptual diagram for minimizing loss in generated output text as compared to input text, in accordance with aspects described herein. Sample space 102 represents the universe of possible output text (for example sentences) generated based on input text x (for instance a sentence). Area 104—a circle in this example with x in the middle—represents candidate proximity loss. The area 104 contains candidate output text considered sufficiently proximate the input text x. Area 106, a circle that is concentric with circle 104 and a proper subset thereof, and has input text x as its center point, represents diversity loss. Text that falls outside of circle 106 is considered to be sufficiently diverse from input text x along the attribute class dimension, meaning that the lack of overlap between input text x and the text outside of circle 106 imparts sufficient diversity in the debiasing effort. Minimizing diversity loss encourages production of counterfactuals: {brown hair→blonde hair, red hair, black hair, etc.}, {right handed→left-handed, ambidextrous}, {father→mother, etc.}, and so on. In general, the more diversity (farther from x) the better in terms of the debiasing effort.

Desirable output text is therefore text that is sufficiently proximate input text x (i.e. within circle 104) but sufficiently diverse from input text x (outside of circle 106). The space between circles 104 and 106 is therefore a desired region insofar as compositing proximity loss and diversity loss for purposes of output text generation and selection.

Curve 108 represents attribute loss, and a focus may be to minimize or reduce attribute loss to the extent possible. In this example, text falling to the right of curve 108 represents desirable output text candidates in terms of attribute loss.

Curve 110 is a decision boundary representing label loss. Text falling to the right of curve 108 represents desirable output text candidates in terms of label loss.

Curve 112 represents any other loss objectives that may be considered. There may be other kinds of losses or constraints that would eliminate otherwise acceptable output text samples. For instance, there may be a list of acceptable (and/or unacceptable) text, words, etc. that should or should not appear in the corpus. As another example, 112 may filter out samples already appearing in the corpus in order to eliminate would-be duplicate samples.

As a result, the optimization function can seek to capture text falling (i) between areas 104 and 102, (ii) to the right of curves 108 and 110, and (iii) above curve 112 in this example. Area 114 denotes the desirable region in FIG. 1. If additional loss objectives represented by curve 112 did not exist, then the desirable region would also include area denoted 115.

Figure 2:
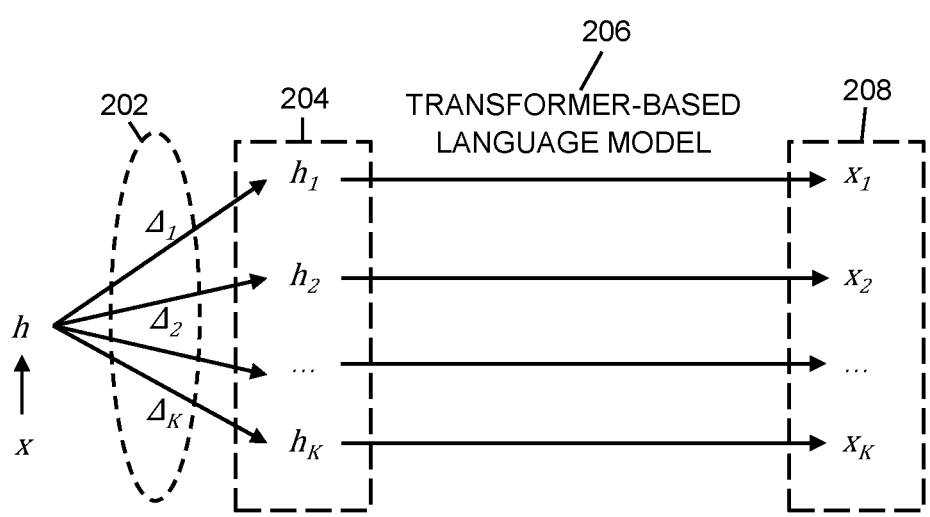
FIG. 2 depicts an example conceptual representation of the architecture design for generating training text for debiasing a machine learning model training corpus in accordance with aspects described herein.

FIG. 2 depicts an example conceptual representation of the architecture design for generating training text for debiasing a machine learning model training corpus in accordance with aspects described herein. Input text x provides a seed or pivot point, for instance an attribute or attributes h, from which output text is generated.

From h is produced intermediate text $h_1$ though $h_K$ based on differing proximity variations 202 which are denoted as $\Delta_1$ through $\Delta_K$. The $h_i$ values 204 represent, for instance, candidates falling within the proximity loss area 104 in FIG. 1. Here there are K different sets of text $h_i$ with different proximity losses relative to the input. It is noted that any given $h_i$ may actually be more than one text (sentence, phrase, etc.) if they each have the same proximity loss $\Delta_i$. From this intermediate set 204, and with deference to minimizing diversity loss or keeping it below some threshold (conceptually, to remain outside of area 106 of FIG. 1), a transformer-based language model 206 is applied to provide output text candidates 208. As noted, the transformer-based language model can predict next text given a set of input text. This may be leveraged by adding a hyperparameter and specifying an optimization function that considers loss function(s) above, aiming to generate text corresponding to the specific attribute(s) of focus (minimizing attribute loss) and label loss. From the output candidates 208 ($x_1, \ldots, x_K$ in this example), one or more are selected, the one or more being those with minimum composite loss, or loss below some threshold, for instance.

By way of specific example to highlight attribute-specific attention (attribute loss), proximity to the input text (proximity loss) and generation of counterfactuals (diversity loss), consider the input text: "Adam Smith, known as Father of Capitalism, was a renowned economist who lived in pre-19th century Europe". This is an example sentence of an initial machine learning model training corpus, and the goal may be to debias this training corpus in part by adding a sentence to the corpus such that gender bias (in this example) imparted by this since input text is at least partially neutralized by the output text, and consequently the training corpus with the output text added is less biased. In this example, "economist" is identified as the primary attribute around which this sentence is keyed. An example generated output text is "Rosa Luxemburg, a revolutionary socialist and renowned economist lived in pre-19th century Europe".

Attribute-specific attention captured through the attribute loss objective captures that notion that it is desired to minimize loss around the attribute 'economist'. Here, a sample was generated that also focuses on an economist, and attribute loss in this example is minimal or none.

Proximity loss could be interpreted in varying ways and may be an aggregate across several dimensions. One example of proximity is considering the number of words in the input text as compared to the output text, with a greater difference in number of words means more proximity loss. Another example, for instance applicable to the above example, is around a temporal character. The subject of the input text was Adam Smith who lived pre-19th century, and the subject of the output text is also someone who lived pre-19th century. Proximity loss on the temporal dimension is relatively low here. While there is some proximity loss on the dimension of economic system, as the subject Adam Smith of the input text was associated with capitalism while the subject Rosa Luxemburg of the output text was associated with socialism, this proximity loss may not be significant because 'economist' was the identified attribute of focus from the input text.

Diversity loss that is focused on generating counterfactuals is minimized here in that overlap along the attribute class is minimized—the output text focuses on a female 'economist'. The attribute 'economist' corresponds to an attribute class that encompasses at least male and female subjects, but the input text about Adam Smith is biased with respect to that attribute class because it focuses on a male economist (Adam Smith). The output text here imparts diversity with respect to that attribute class by focusing on a female economist, Rosa Luxemburg.

Label loss here depends on labeling of the input sentence. As one example, if the input text is tagged/labeled as 'economics' or 'finance', then the output text would also accurately be labeled as such.

It is seen that the generated output text is a factual example that the architecture can produce when seeking to generate additional samples. For instance, given an intermediate sentence h about Rosa Luxemburg (identified as an economist), this is expanded (for instance using the transformer model) to the output text above with consideration and optimization of the loss objectives discussed herein. Here, it kept the output text within the proximity of the input text while allowing for structural diversity around the attribute "economist" along a different attribute class (gender) value. Debiasing is imparted by the fact that the additional training example provides representation of other class values. Including the generated output text in the machine learning model training corpus facilitates debiased training of a machine learning model using that machine learning model training corpus with the included output text.

Additionally or alternatively, generated output text could be used as baselines for comparing against output text of other debiasing models, in order to evaluate their performance in producing adequate (low loss) additional training samples to effectively debias a training corpus.

Aspects described herein can be used in natural language processing solutions and applications for fairness in artificial intelligence infrastructures.

Figure 3:
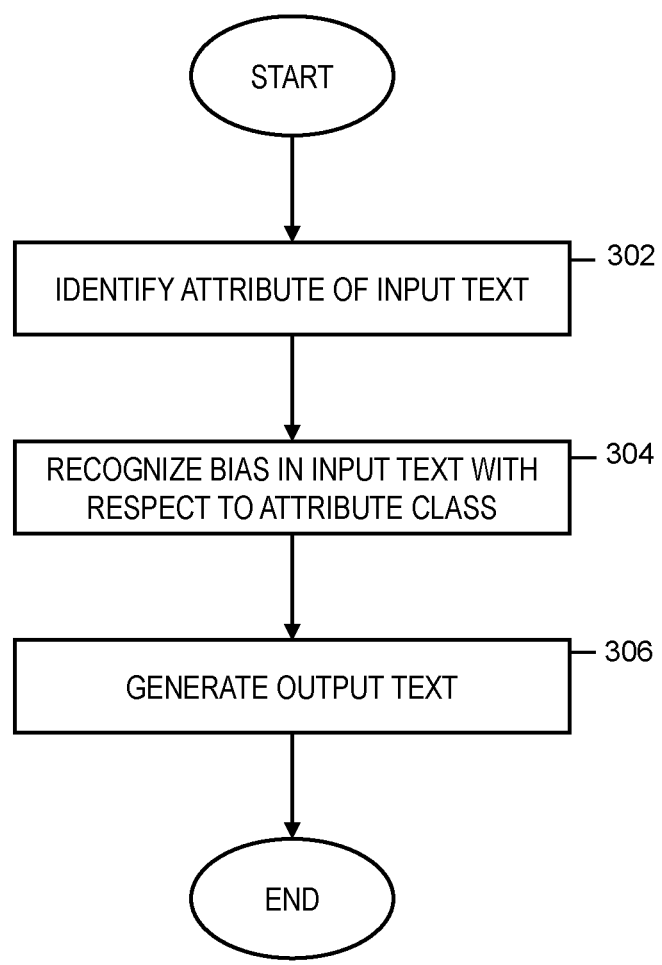
FIG. 3 depicts an example process for generating training text for debiasing a machine learning model training corpus in accordance with aspects described herein.

Accordingly, FIG. 3 depicts an example process for generating training text for debiasing a machine learning model training corpus in accordance with aspects described herein. In some examples, the process is performed by one or more computer systems, such as those described herein.

The process begins by identifying (302) an attribute of input text. The input text may be selected from a machine learning model training corpus and may include one or more words of the input text. The attribute corresponds to an attribute class encompassing a plurality of different possible class values. The process also recognizes (304) bias in the input text with respect to the attribute class. Recognizing the bias includes, in one example, identifying that one possible class value of the plurality of different possible class values of the attribute class is represented by the input text while at least one other possible class value of the plurality of different possible class values of the attribute class is not represented by the input text.

The process proceeds by generating (306) output text that corresponds to the attribute and imparts diversity (i) with respect to the attribute class and (ii) relative to the input text. The generating the output text uses an optimization function based on loss objectives to minimize loss in the generated output text as compared to the input text. In some examples the output text corresponds to the attribute in that it includes the attribute (no attribute loss) or encompass the attribute, though in other examples there is some level of attribute loss.

I embodiments, the loss objectives include (i) a label loss corresponding to cross entropy in the generated output text as compared to the input text, (ii) a proximity loss corresponding to loss of proximity of the generated output text as compared to the input text, (iii) an attribute loss corresponding to loss of attentiveness to the identified attribute in the generated output text as compared to the input text, and/or (iv) diversity loss corresponding to overlap in diversity with respect to the attribute class of the generated output text as compared to the input text. The optimization function to minimize loss in the generated output text as compared to the input text could, in selecting candidate output text to output as the generated output text, seek to minimize a composite (for instance a sum, which could have its terms weighted) of the considered label loss, proximity loss, attribute loss, and/or diversity loss for those candidates.

The optimization function could encourage diversity in representation of the different possible class values of the attribute class by minimizing the diversity loss as part of the optimization, in order to minimize overlap in diversity with respect to the attribute class of the generated output text as compared to the input text, and thereby maximize diversity in representation of the different possible class values of the attribute class across the collective input text and generated output text.

In embodiments, the input text is or includes a sentence (or phrase or paragraph) and the generated output text is or includes one or more output sentences (or phrases or paragraphs, as the case may be). In the example of output sentences, each such output sentence could represent a respective different possible class value of the different possible class values of the attribute class.

In some embodiments, the process of FIG. 3 further includes including the generated output text in a machine learning model training corpus to facilitate debiased training of a machine learning model using that machine learning model training corpus with the included output text. By providing the output text along with the input text as samples in the training corpus, bias that would otherwise be imparted in the model being trained (i.e. if the output text were not generated and included therein) may be neutralized by the inclusion of the additional training samples provided by the output text.

Additionally or alternatively, generated output text could be used as a baseline for comparison against output of a training corpus debiasing model (a model to debias a training corpus) in order to evaluate performance of that training corpus debiasing model in debiasing the subject machine learning model training corpus.

Although various examples are provided, variations are possible without departing from a spirit of the claimed aspects.

Figure 4:
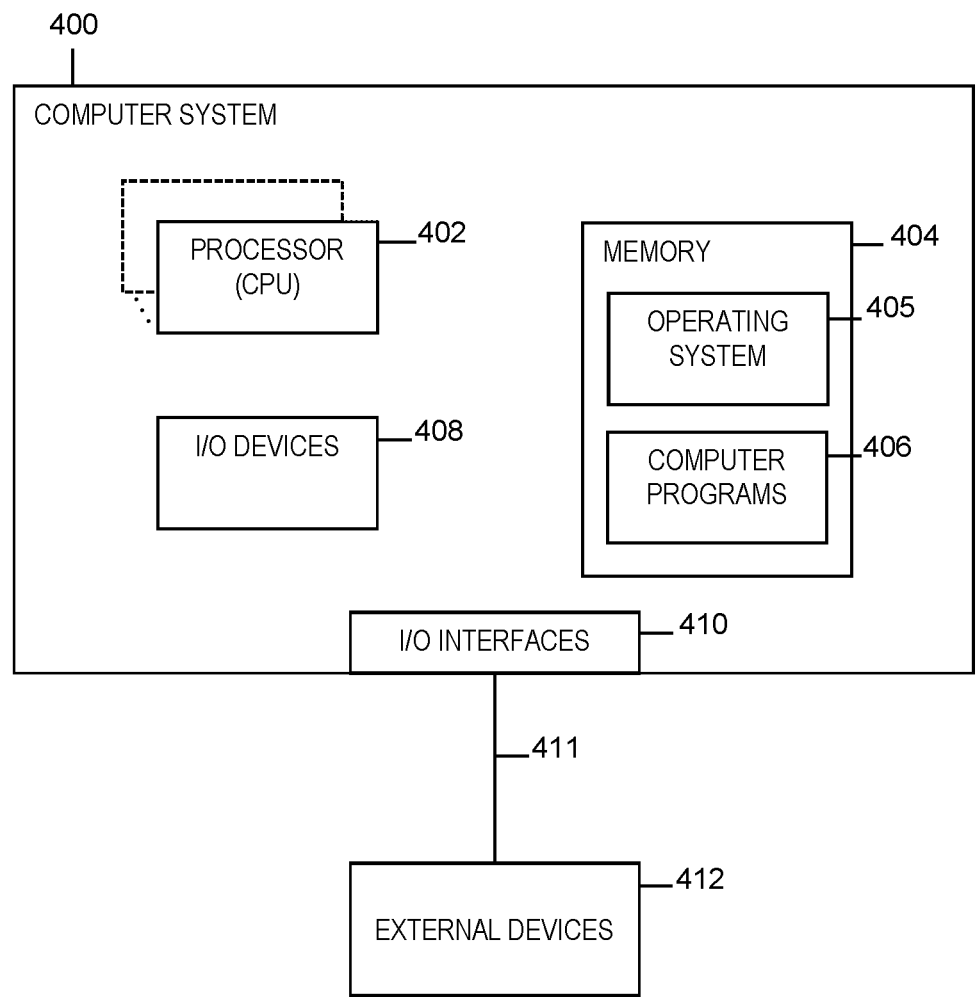
FIG. 4 depicts one example of a computer system and associated devices to incorporate and/or use aspects described herein.

Processes described herein may be performed singly or collectively by one or more computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
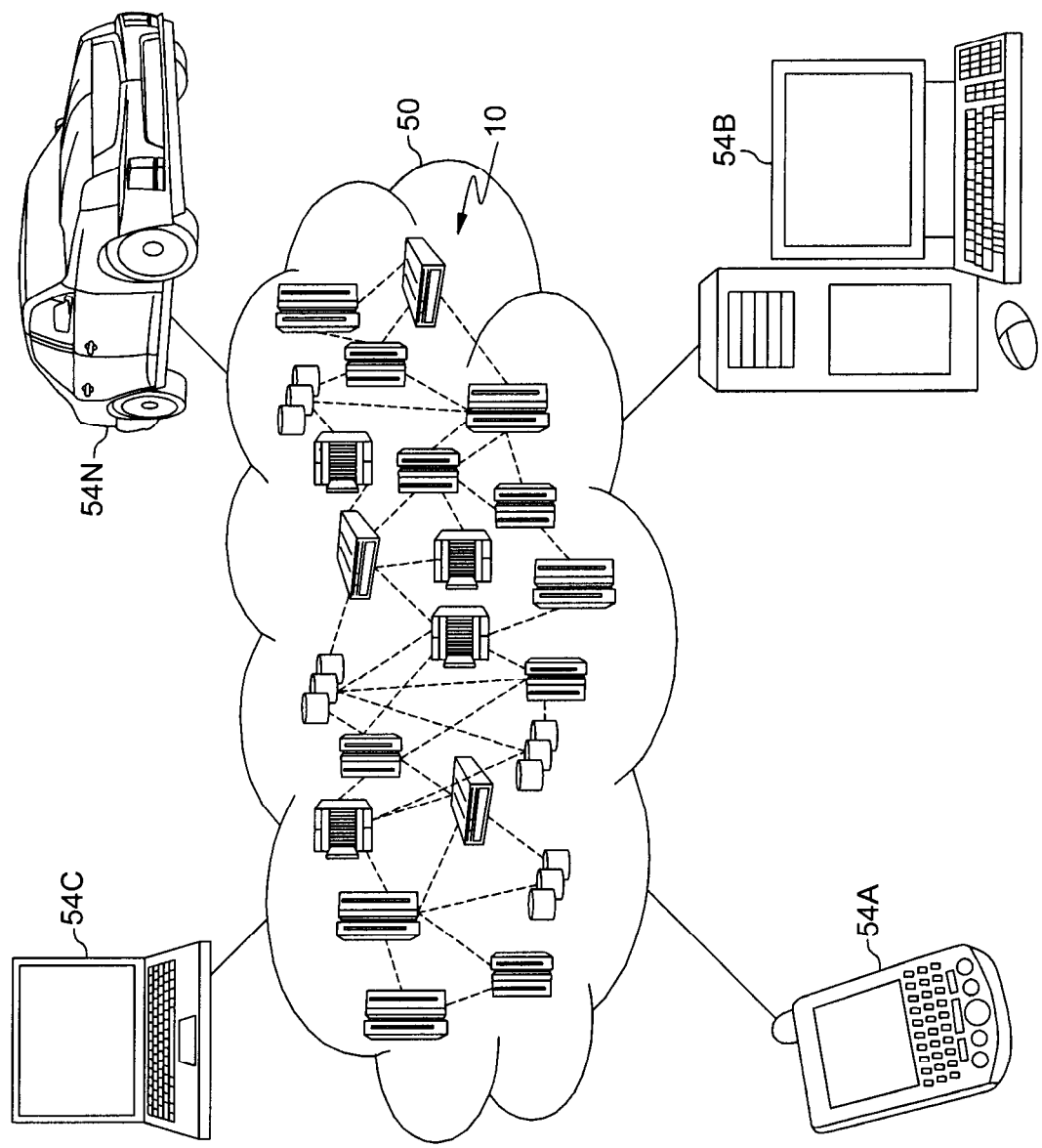
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
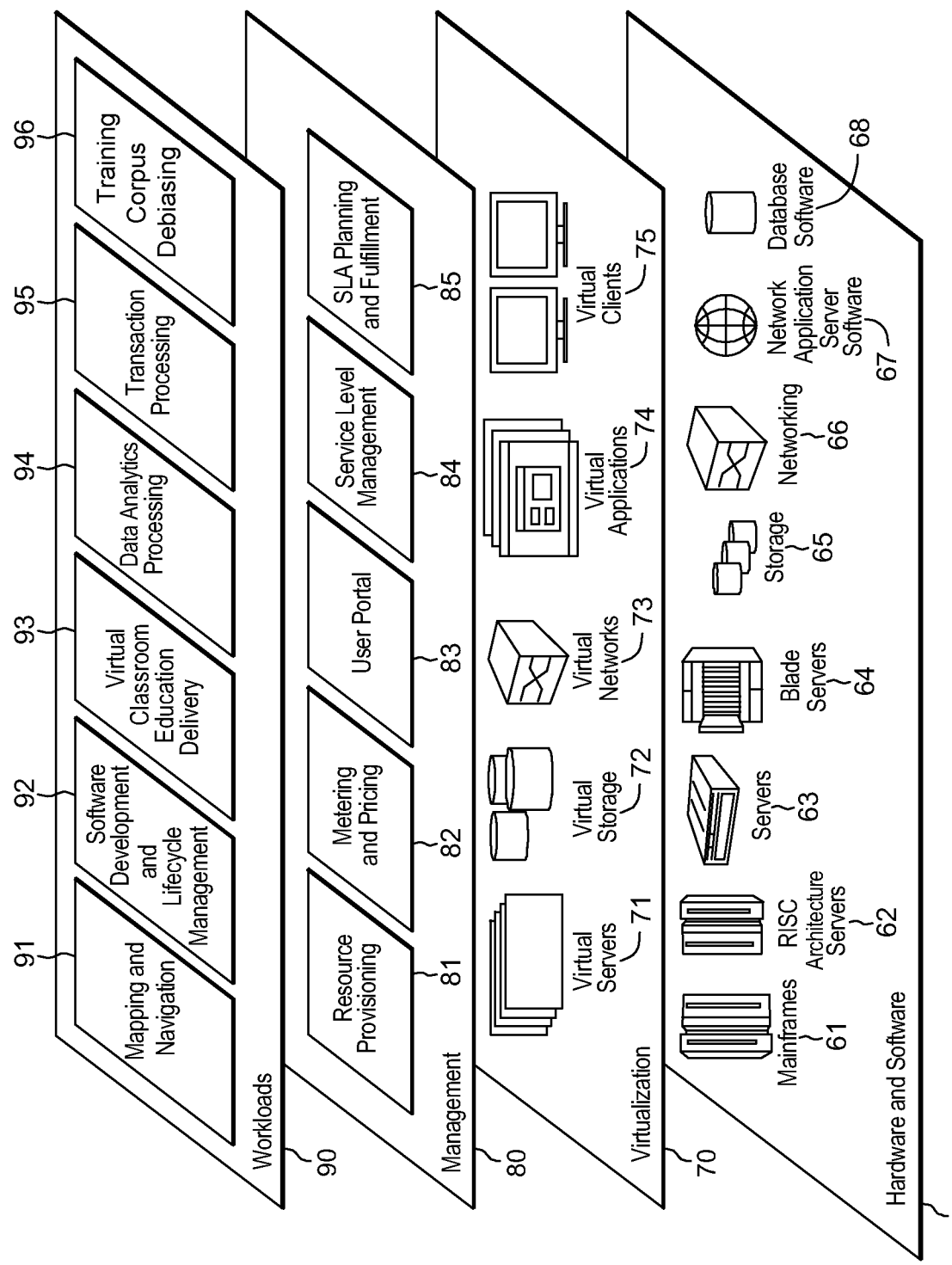
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training corpus debiasing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions D-2 10/27/2020 by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
    identifying an attribute of input text, the input text selected from a machine learning model training corpus, the attribute comprising one or more words of the input text, and the attribute corresponding to an attribute class encompassing a plurality of different possible class values;
    recognizing bias in the input text with respect to the attribute class; and
    generating output text corresponding to the attribute and imparting diversity with respect to the attribute class and relative to the input text, wherein generating the output text uses an optimization function based on a plurality of loss objectives to minimize loss in the generated output text as compared to the input text, the plurality of loss objectives comprising a label loss, a proximal loss, an attribute loss, and a diversity loss.

2. The method of claim 1, wherein recognizing the bias comprises identifying that one possible class value of the plurality of different possible class values of the attribute class is represented by the input text and at least one other possible class value of the plurality of different possible class values of the attribute class is not represented by the input text.

3. The method of claim 1, wherein the input text comprises a sentence and wherein the generated output text comprises one or more output sentences.

4. The method of claim 3, wherein each output sentence of the one or more output sentences represents a respective different possible class value of the plurality of different possible class values of the attribute class.

5. The method of claim 1, further comprising including the generated output text in the machine learning model training corpus to facilitate debiased training of a machine learning model using the machine learning model training corpus.

6. The method of claim 1, further comprising using the generated output text as a baseline for comparison against output of a training corpus debiasing model to evaluate performance of the training corpus debiasing model in debiasing the machine learning model training corpus.

7. The method of claim 1, wherein the label loss corresponds to cross entropy in the generated output text as compared to the input text, the proximity loss corresponds to loss of proximity of the generated output text as compared to the input text, the attribute loss corresponds to loss of attentiveness to the identified attribute in the generated output text as compared to the input text, and the diversity loss corresponds to overlap in diversity with respect to the attribute class of the generated output text as compared to the input text.

8. The method of claim 7, wherein the optimization function to minimize loss in the generated output text as compared to the input text minimizes a composite of the label loss, the proximity loss, the attribute loss, and the diversity loss in selecting candidate output text to output as the generated output text.

9. The method of claim 7, wherein the optimization function encourages diversity in representation of the plurality of different possible class values of the attribute class by minimizing the diversity loss to minimize overlap in diversity with respect to the attribute class of the generated output text as compared to the input text, thereby maximizing diversity in representation of the plurality of different possible class values of the attribute class across the input text and the generated output text.

10. A computer system comprising:
a memory; and
a processor in communication with the memory, wherein the computer system is configured to perform a method comprising:
identifying an attribute of input text, the input text selected from a machine learning model training corpus, the attribute comprising one or more words of the input text, and the attribute corresponding to an attribute class encompassing a plurality of different possible class values;
recognizing bias in the input text with respect to the attribute class; and
generating output text corresponding to the attribute and imparting diversity with respect to the attribute class and relative to the input text, wherein generating the output text uses an optimization function based on a plurality of loss objectives to minimize loss in the generated output text as compared to the input text, the plurality of loss objectives comprising a label loss, a proximity loss, an attribute loss, and a diversity loss.

11. The computer system of claim 10, wherein recognizing the bias comprises identifying that one possible class value of the plurality of different possible class values of the attribute class is represented by the input text and at least one other possible class value of the plurality of different possible class values of the attribute class is not represented by the input text.

12. The computer system of claim 10, wherein the input text comprises a sentence, wherein the generated output text comprises one or more output sentences, and wherein each output sentence of the one or more output sentences represents a respective different possible class value of the plurality of different possible class values of the attribute class.

13. The computer system of claim 10, wherein the method further comprises including the generated output text in the machine learning model training corpus to facilitate debiased training of a machine learning model using the machine learning model training corpus.

14. The computer system of claim 10, wherein the label loss corresponds to cross entropy in the generated output text as compared to the input text, the proximity loss corresponds to loss of proximity of the generated output text as compared to the input text, the attribute loss corresponds to loss of attentiveness to the identified attribute in the generated output text as compared to the input text, and the diversity loss corresponds to overlap in diversity with respect to the attribute class of the generated output text as compared to the input text.

15. The computer system of claim 14, wherein the optimization function encourages diversity in representation of the plurality of different possible class values of the attribute class by minimizing the diversity loss to minimize overlap in diversity with respect to the attribute class of the generated output text as compared to the input text, thereby maximizing diversity in representation of the plurality of different possible class values of the attribute class across the input text and the generated output text.

16. A computer program product comprising:
a computer readable storage medium readable by a processing circuit and storing instructions for execution by the processing circuit for performing a method comprising:
identifying an attribute of input text, the input text selected from a machine learning model training corpus, the attribute comprising one or more words of the input text, and the attribute corresponding to an attribute class encompassing a plurality of different possible class values;
recognizing bias in the input text with respect to the attribute class; and
generating output text corresponding to the attribute and imparting diversity with respect to the attribute class and relative to the input text, wherein generating the output text uses an optimization function based on a plurality of loss objectives to minimize loss in the generated output text as compared to the input text, the plurality of loss objectives comprising a label loss, a proximity loss, an attribute loss, and a diversity loss.

17. The computer program product of claim 16, wherein recognizing the bias comprises identifying that one possible class value of the plurality of different possible class values of the attribute class is represented by the input text and at least one other possible class value of the plurality of different possible class values of the attribute class is not represented by the input text.

18. The computer program product of claim 16, wherein the input text comprises a sentence, wherein the generated output text comprises one or more output sentences, and wherein each output sentence of the one or more output sentences represents a respective different possible class value of the plurality of different possible class values of the attribute class.

19. The computer program product of claim 16, wherein the method further comprises including the generated output text in the machine learning model training corpus to facilitate debiased training of a machine learning model using the machine learning model training corpus.

20. The computer program product of claim 16, wherein the label loss corresponds to cross entropy in the generated output text as compared to the input text, the proximity loss corresponds to loss of proximity of the generated output text as compared to the input text, the attribute loss corresponds to loss of attentiveness to the identified attribute in the generated output text as compared to the input text, and the diversity loss corresponds to overlap in diversity with respect to the attribute class of the generated output text as compared to the input text.

* * * * *